(12) United States Patent
Nagamine et al.

(10) Patent No.: US 8,134,594 B2
(45) Date of Patent: Mar. 13, 2012

(54) SURROUNDING RECOGNITION ASSISTING DEVICE FOR VEHICLE

(75) Inventors: Noboru Nagamine, Anjo (JP); Kazuya Watanabe, Anjo (JP); Takeshi Naito, Toyota (JP); Tadashi Asano, Gifu (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 290 days.

(21) Appl. No.: 12/625,023

(22) Filed: Nov. 24, 2009

(65) Prior Publication Data

US 2010/0128128 A1 May 27, 2010

(30) Foreign Application Priority Data

Nov. 27, 2008 (JP) ................. 2008-302807

(51) Int. Cl.
- G08G 1/16 (2006.01)
- H04N 9/64 (2006.01)
- H04N 9/74 (2006.01)
- G08G 1/04 (2006.01)
- H04N 7/22 (2006.01)

(52) U.S. Cl. ........................ 348/149; 348/148
(58) Field of Classification Search .................. 348/148, 348/149
See application file for complete search history.

(56) References Cited

U.S. PATENT DOCUMENTS

| | | | | |
|---|---|---|---|---|
| 7,952,490 B2 * | 5/2011 | Fechner et al. | ............... | 340/901 |
| 2001/0031666 A1 * | 10/2001 | Knecht | ..................... | 473/223 |
| 2002/0167589 A1 * | 11/2002 | Schofield et al. | ............. | 348/148 |
| 2005/0134479 A1 | 6/2005 | Isaji et al. | | |
| 2007/0290823 A1 * | 12/2007 | Watanabe et al. | ............. | 340/435 |
| 2007/0299584 A1 * | 12/2007 | Okamoto et al. | ............... | 701/41 |
| 2008/0246843 A1 * | 10/2008 | Nagata et al. | ................. | 348/148 |

FOREIGN PATENT DOCUMENTS

| | | |
|---|---|---|
| JP | 2004-173195 A | 6/2004 |
| JP | 2005-182306 A | 7/2005 |

OTHER PUBLICATIONS

"Akira", TMS Entertainment, Dir. Katsuhiro Otomo (Released Jul. 16, 1988) (two stills provided in file).*

* cited by examiner

*Primary Examiner* — David Czekaj
*Assistant Examiner* — David N Werner
(74) *Attorney, Agent, or Firm* — Sughrue Mion, PLLC

(57) ABSTRACT

A surrounding recognition assisting device for a vehicle includes an image receiving portion for receiving a captured footage, which is configured with plural frames captured by an image capturing device for capturing a view around the vehicle, a target image area-detecting portion for detecting an image area including a picture element belonging to a predetermined color space corresponding to a display color of a direction indicator within a target frame out of plural frames, as a target image area, a residual image generating portion for applying a predetermined weighting to an image within the target image area to generate a residual image, and a display image generating portion for superimposing the residual image on at least one of frames following the target frame so that the residual image is superimposed on the frame at a corresponding coordinate to generate a display image to be displayed on a display device.

12 Claims, 5 Drawing Sheets

SURROUNDING RECOGNITION ASSISTING DEVICE FOR VEHICLE

CROSS REFERENCE TO RELATED APPLICATIONS

This application is based on and claims priority under 35 U.S.C. §119 to Japanese Patent Application 2008-302807, filed on Nov. 27, 2008, the entire content of which is incorporated herein by reference.

TECHNICAL FIELD

This disclosure generally relates to a surrounding recognition assisting device for a vehicle, which induces a driver to pay attention spontaneously to an object existing near the vehicle and to visually confirm the safety in order to assist the driver to perform an appropriate driving.

BACKGROUND DISCUSSION

Generally, when driving a vehicle, a driver is supposed to confirm circumstances around the vehicle, such as an existence or approach of a human being or an object towards the vehicle. In order to assist the confirmation of the circumstances, a known drive assisting device and a surrounding monitoring device for a vehicle, each of which includes a camera at a vehicle and which displays a captured image on a monitor device provided inside the vehicle, have been suggested. For example, disclosed in JP2004-173195A is a monitoring device for a vehicle, which recognizes a lighting state of a blinker of another vehicle driving on an adjacent lane relative to a lane on which the subject vehicle is traveling on the basis of a color image and actuates a warning device in a case where a warning is necessary on the basis of the recognition result. According to the monitoring device for the vehicle disclosed in JP2004-173195A, the warning device is actuated, for example, in a case where the other vehicle is about to merge into the lane on which the subject vehicle is traveling, or in a case where a distance between the subject vehicle and the other vehicle is expected to be narrower than a predetermined distance.

Disclosed in JP2005-182306A is a display system for a vehicle, which provides a driver with information which relates to circumstances around the vehicle and which is supposed to be important when driving. The display system for the vehicle disclosed in JP2005-182306A displays an image, which is superimposed on a view expanding ahead of the vehicle, at a display area provided at a windshield. More specifically, the display system for the vehicle recognizes a predetermined object (a target) within a color image capturing the view expanding ahead of the vehicle. Then, the display system for the vehicle detects a red light component of the object in order to display and emphasize a position of the red light component of the object within the display area at the windshield. The object (the target) includes a vehicle traveling in front of the subject vehicle, traffic indications and the like. The red light component within the image capturing the object indicates a stop lamp of the vehicle traveling in front of the subject vehicle, or a color of the traffic indication. The display system for the vehicle disclosed in JP2005-182306A detects an eye point of the driver in order to specify the position of the red light component within the display area at the windshield on the basis of a position of the eye point. Then, the display system for the vehicle generates a display image in which the position of the red light component is emphasized. The display system for the vehicle displays the generated display image on the display area at the windshield.

The monitoring device for the vehicle disclosed in JP2004-173195A recognizes a flickering state of the blinker of the other vehicle and determines whether or not the warning is necessary. Therefore, a relatively great calculation load is applied to the monitoring device for the vehicle. Furthermore, because the monitoring device for the vehicle actuates the warning device rather than inducing the driver to pay attention, the driver may feel irksome. According to the display system for the vehicle disclosed in JP2005-182306A, because the traffic indication or the vehicle traveling in front of the subject vehicle is recognized and then the red light component is detected, a relatively great calculation load is likely to be applied to the display system for the vehicle. Furthermore, the display system for the vehicle needs to include a camera for specifying the eye point of the driver in order to generate the display image on the basis of the eye point of the driver. Additionally, the display system for the vehicle actively displays the object while emphasizing the same rather than inducing the driver to pay attention, the driver may feel irksome.

Generally, a visual confirmation by the driver is considered to be important when driving. When the driver visually confirms the circumstances, i.e. when the driver moves his/her face dynamically, cognition or judgment of the driver or reaction ability relating to a driving operation may be improved. Accordingly, a recognition assist for inducing the driver to confirm the circumstances around the vehicle is considered to be important. However, there exists no system for indirectly informing the driver, such as recognition assist for giving the driver an indication to induce the driver to pay attention and to confirm the circumstances.

A need thus exists to provide a surrounding recognition assisting device for a vehicle which is not susceptible to the drawback mentioned above.

SUMMARY

According to an aspect of this disclosure, a surrounding recognition assisting device for a vehicle includes an image receiving portion for receiving a captured footage, which is configured with a plurality of frames captured by an image capturing device for capturing a view around the vehicle, a target image area-detecting portion for detecting an image area including a picture element belonging to a predetermined color space corresponding to a display color of a direction indicator within a target frame out of the plurality of frames, which configure the captured footage, as a target image area, a residual image generating portion for applying a predetermined weighting to an image within the target image area in order to generate a residual image, and a display image generating portion for superimposing the residual image on at least one of frames following the target frame so that the residual image is superimposed on the frame at a corresponding coordinate to generate a display image to be displayed on a display device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
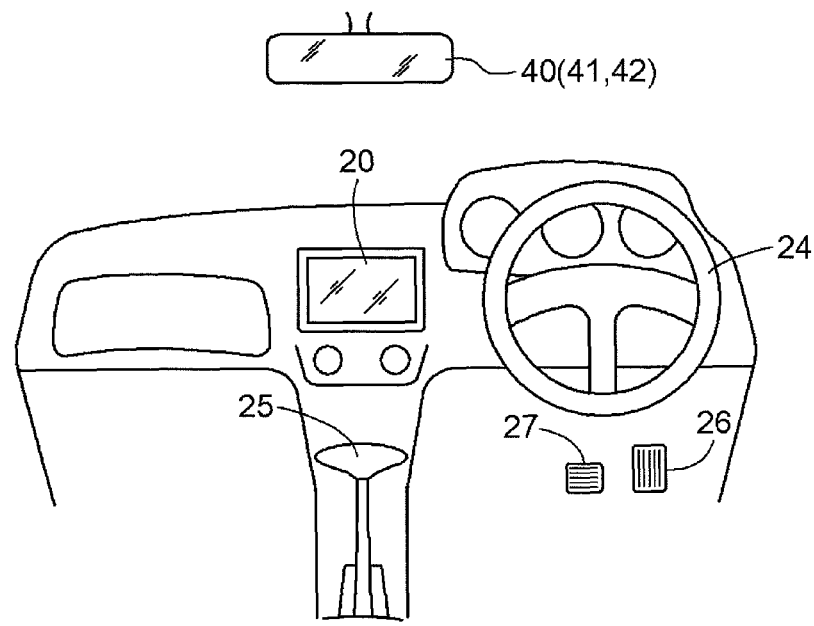
FIG. 1 is a diagram schematically illustrating a front portion of a compartment of a vehicle relative to a driver seat.
Figure 2:
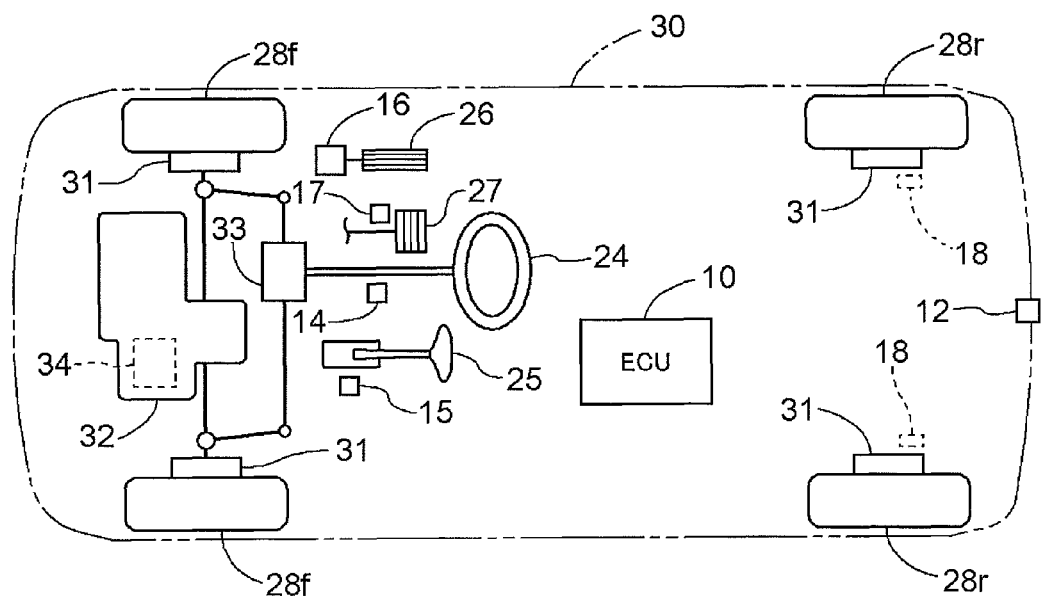
FIG. 2 is a block diagram illustrating a basic configuration of the vehicle.

An embodiment of a surrounding recognition assisting device for a vehicle (which will be hereinafter referred to as a surrounding recognition assisting device) will be described below with reference to the attached drawings. Illustrated in FIGS. 1 and 2 are a basic configuration of a vehicle 30 to which the surrounding recognition assisting device is mounted. A steering wheel 24, which is provided at a driver seat, is operated in conjunction with a power steering unit 33, so that a rotational operating force applied to the steering wheel 24 is transmitted to front wheels 28f, thereby steering the vehicle 30. As illustrated in FIG. 2, an engine 32 and a transmission apparatus 34 are provided at a front portion of the vehicle 30. The transmission apparatus 34 includes a torque converter, a continuously variable transmission (CVT) or the like for changing a speed of a force generated by the engine 32 and transmitting the force to the front wheels 28f or rear wheels 28r. More specifically, the force generated by the engine 32 is transmitted either to the front wheels 28f or the rear wheels 28r, or to both of the front wheels 28f and the rear wheels 28r depending on a driving system (either a front-wheel driver system, a rear-wheel driver system or a four-wheel driver system). An acceleration pedal 26 and a brake pedal 27 are arranged in parallel with each other in the vicinity of the driver seat. The acceleration pedal 26 serves as an acceleration operation means for controlling a traveling speed of the vehicle 30. The brake pedal 27 generates a braking force to be applied to the front wheels 28f and the rear wheels 28r via brake devices 31, which are provided at the front wheels 28f and the rear wheels 28r respectively, when a driver depresses the brake pedal 27.

A monitor 20 is provided at an upper portion of a console, which is provided in the vicinity of the driver seat. A liquid crystal-type monitor having a backlight is adapted as the monitor 20 in this embodiment. The monitor 20 may be configured so as to include a pressure sensitive-type touch panel or an electrostatic-type touch panel, so that a position (a point) touched by a finger of the driver is inputted as a location data, i.e. so that an instruction input by the driver is acceptable. Furthermore, the monitor 20 may be configured to include a speaker, so that various guide messages or sound effects are outputted therefrom. In a case where a navigation system is provided to the vehicle 30, the monitor 20 may be configured so as to use a screen display of the navigation system as the monitor. Additionally, a plasma display-type monitor or a cathode ray tube (CRT)-type monitor may be used as the monitor 20. Furthermore, the speaker may be provided at other locations such as an inner portion of a door and the like.

A rear-view mirror 40 for reflecting a view expanding rearwardly of the vehicle 30 (i.e. a rear view of the vehicle 30) is provided above the driver seat. The rear-view mirror 40 includes a mirror portion 41, which serves as a mirror for reflecting the view expanding rearwardly of the vehicle 30, and a display portion 42 for displaying at least a portion of a display image displayed on the monitor 20. The monitor 20, the display portion 42 and the rear-view mirror 40 including the display portion 42 serve as display devices. The mirror portion 41 configures a half mirror, so that a liquid crystal display is provided at a back side (i.e. an inner side) of the half mirror as the display portion 42. While the liquid crystal display is not actuated (i.e. while the liquid crystal display is turned off), the half mirror functions as the mirror. On the other hand, in a case where the display image is displayed on the liquid crystal display, the display image is superimposed on the rear view reflected on the half mirror.

An alpha blending ($\alpha$ blending) technique may be used to superimpose the display image on the rear view reflected on the half mirror. More specifically, color information treated on a computer includes color channels ($\alpha$ channels) for transparent information in addition to color spaces such as RGB and the like. A semi-transparent image is generated when an image is multiplied by a value indicative of the transparent information, i.e. $\alpha$ value. Accordingly, by using the a blending technique, the surrounding recognition assisting device may give the driver a vague indication of an object. As a result, a system for inducing the driver to pay attention to circumstances spontaneously without causing an irksome feeling may be obtained.

As illustrated in FIG. 2, a steering sensor 14 is provided at an operation system of the steering wheel 24 in order to detect an operation direction and a steering quantity of the steering wheel 24. A shift position sensor 15 is provided at an operation system of a gear lever 25 in order to detect a shift position of the gear lever 25. Furthermore, an acceleration sensor 16 is provided at an operation system of the acceleration pedal 26 in order to detect an operation quantity of the acceleration pedal 26. A brake sensor 17 is provided at an operation system of the brake pedal 27 in order to detect whether or not the brake pedal 27 is operated.

A rotation sensor 18, which serves as a moving distance sensor, is provided either at the front wheels 28f or the rear wheels 28r in order to detect a rotational quantity thereof. In this embodiment, the rotation sensor 18 is provided at each of the rear-wheels 28r. A moving distance of the vehicle 30 may be measured on the basis of a rotational quantity of a driving system of the transmission apparatus 34. Furthermore, an electronic control unit 10, which will be hereinafter referred to as an ECU 10 and which serves as a core of the surrounding recognition assisting device, is provided at the vehicle 30.

A camera 12 (an image capturing device) is provided at a rear portion of the vehicle 30 in order to capture the rear view of the vehicle 30. A digital camera, which includes an imaging device such as a charge coupled device (CCD) or a CMOS image sensor (CIS) and which outputs information captured by the imaging device in real time as a motion information configured by plural frames, is used as the camera 12. More specifically, the camera films a footage (a moving image) of, for example, fifteen frames per second or thirty frames per second. Furthermore, the camera 12 includes a wide-angle lens so that the camera 12 includes approximately 140 degrees in angle of coverage. The camera 12 is provided at the rear portion of the vehicle 30 so as to face rearward relative to the vehicle 30 while maintaining, for example, approximately 30 degrees of depression, so that the camera 12 captures an image covering an area of up to approximately 8 meters backward from the vehicle 30. The captured image is inputted into the ECU 10.

The camera 12 may be used for, for example, a parking assist system. In a case where the camera 12 is used for the parking assist system, the camera 12 starts capturing images when, for example, the shift position sensor 15 detects that the gear lever 25 is shifted at a reverse position. Then, the view captured by the camera 12 is displayed on the monitor 20. The driver is supposed to driver the vehicle 30 (i.e. park the vehicle 30 or change a moving direction of the vehicle 30) while referring to the rear view displayed on the monitor 20. Additionally, the surrounding recognition assisting device may be configured so that a speed of the vehicle 30 is detected by means of the rotational sensor 18 and a steering angle of the steering wheel 24 is detected by means of the steering sensor 14 in order to superimpose and display a guideline on the captured image. Furthermore, the vehicle 30 may be guided to a parking target position or the like by using a detection result of the acceleration sensor 16 and/or the brake sensor 17.

On the other hand, while the vehicle 30 normally travels, in other words, while the vehicle 30 is moving forward at a moderate traveling speed, the camera 12 does not exert its function as the image capturing device. However, the camera 12 may be configured so as to capture images in order to provide captured images whenever necessary in a case where the vehicle 30 is traveling at a very low speed, e.g. in a case where the vehicle 30 is traveling at 5 to 10 kilometers per hour. In a case where the vehicle 30 is traveling at a speed of more than 30 to 40 kilometers per hour, the vehicle 30 is not likely to suddenly move backward, therefore, the camera 12 may be stopped from capturing images. In other words, an operating rate of the camera 12 while the vehicle 30 is normally driven is very low.

The surrounding recognition assisting device according to the embodiment gives the driver an indication (a hint, an awareness) when another vehicle traveling behind the vehicle 30 is about to change a course (a lane). The driver tends to pay most attention to a front when driving. On the other hand, generally, as described above, the camera 12, which is configured so as to capture the rear view, does not exert its function as the image capturing device while the vehicle 30 is moving forward. Hence, the surrounding recognition assisting device of the embodiment uses the images captured by the camera 12 while the vehicle 30 travels forward in order to monitor the rear view of the vehicle 30. Accordingly, the surrounding recognition assisting device informs the driver of changes in the circumstances, such as appearance or occurrence of something, as the indication.

Figure 3:
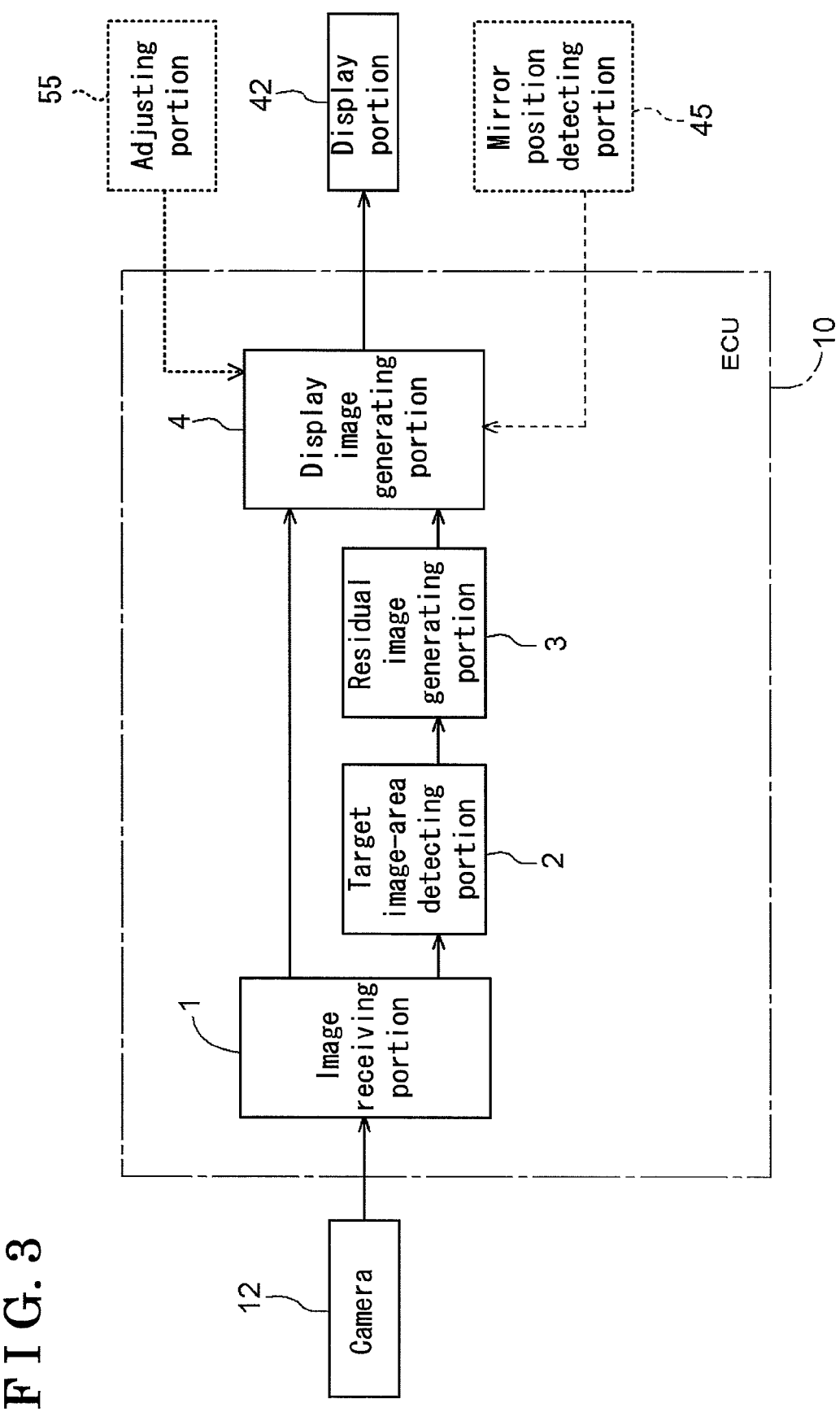
FIG. 3 is a block diagram schematically illustrating a configuration of a surrounding recognition assisting device for the vehicle.

As illustrated in FIG. 3, the surrounding recognition assisting device of the embodiment is configured with the ECU 10 as the core. The ECU 10 includes functional portions such as an image receiving portion 1, a target image area-detecting portion 2, a residual image generating portion 3 and a display image generating portion 4. The ECU 10 is configured with, for example, a microcomputer, a digital signal processor (DSP) or the like. Each of the functional portions may be configured to execute different function by a program and the like. Therefore, the functional portions do not need to be formed within the ECU 10 physically independently of each other. Alternatively, the functional portions may be configured so as to execute different functions by using a single hardware in conjunction with a software such as a program and the like.

The image receiving portion 1 is a functional portion that receives the captured images of the footage, which is configured with plural frames captured by the camera 12 (an in-car camera) that captures a view around the vehicle 30. The target image area-detecting portion 2 is a functional portion that detects an image area including a picture element (a pixel) belonging to a predetermined color space, which corresponds to a display color of a direct indicator, as a target image area within a target frame out of plural frames configuring the captured footage. The residual image generating portion 3 is a functional portion that applies a predetermined weighting to the image within the target image area in order to generate a residual image. The display image generating portion 4 is a functional portion that superimposes the residual image on at least one of the frames following the target frame at the same coordinate. More specifically, the residual image is superimposed on at least one of the frames following the target frame so that a coordinate of the residual image (i.e. the target image area of the target frame) corresponds to a coordinate on at least one of the frames following the target frame. Accordingly, the display image generating portion 4 generates a display image to be displayed on the display device.

Figure 4:
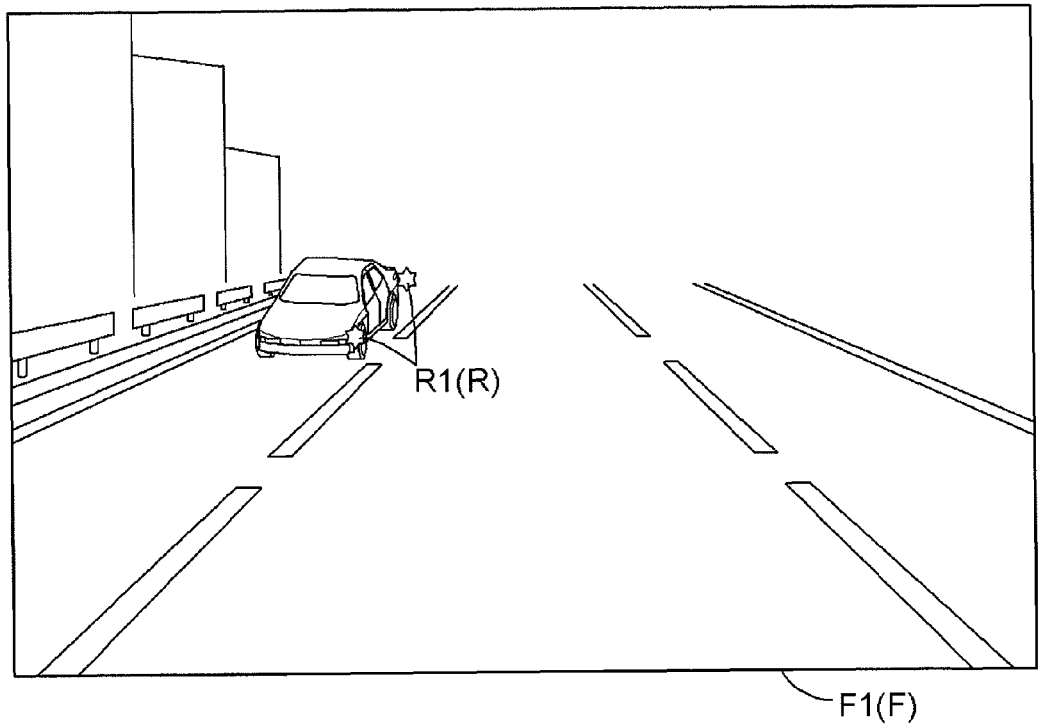
FIG. 4 is a diagram illustrating an example of a display image displayed on a monitor.
Figure 5:
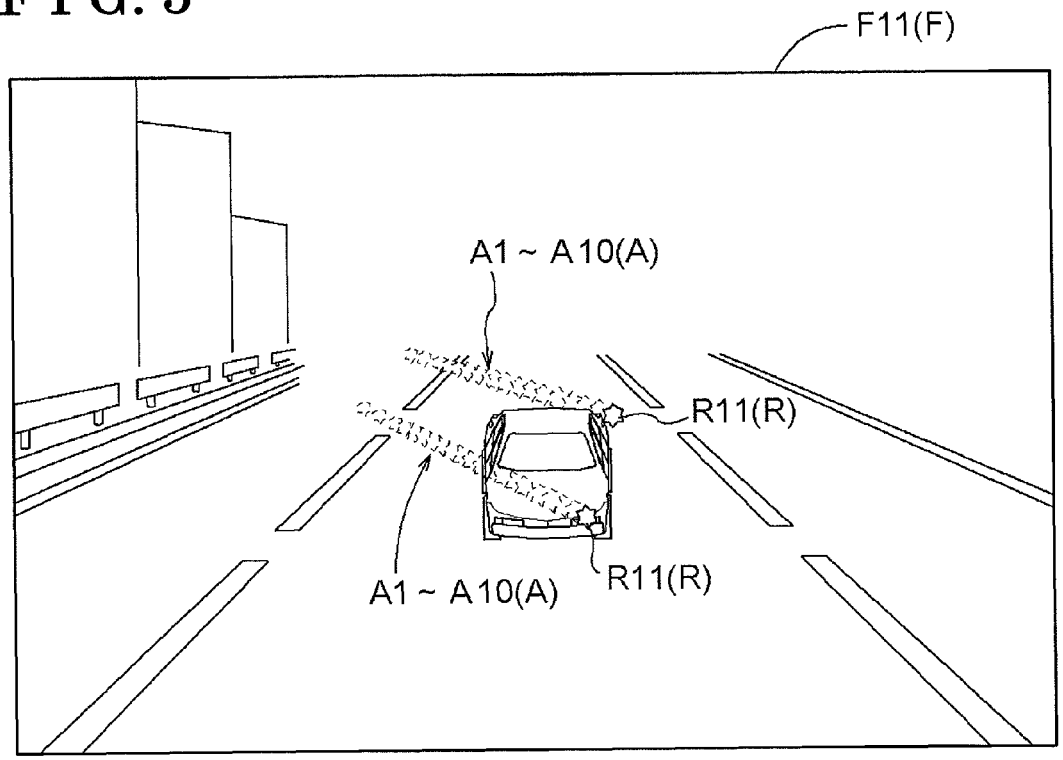
FIG. 5 is a diagram illustrating another example of a display image displayed on the monitor.
Figure 6:
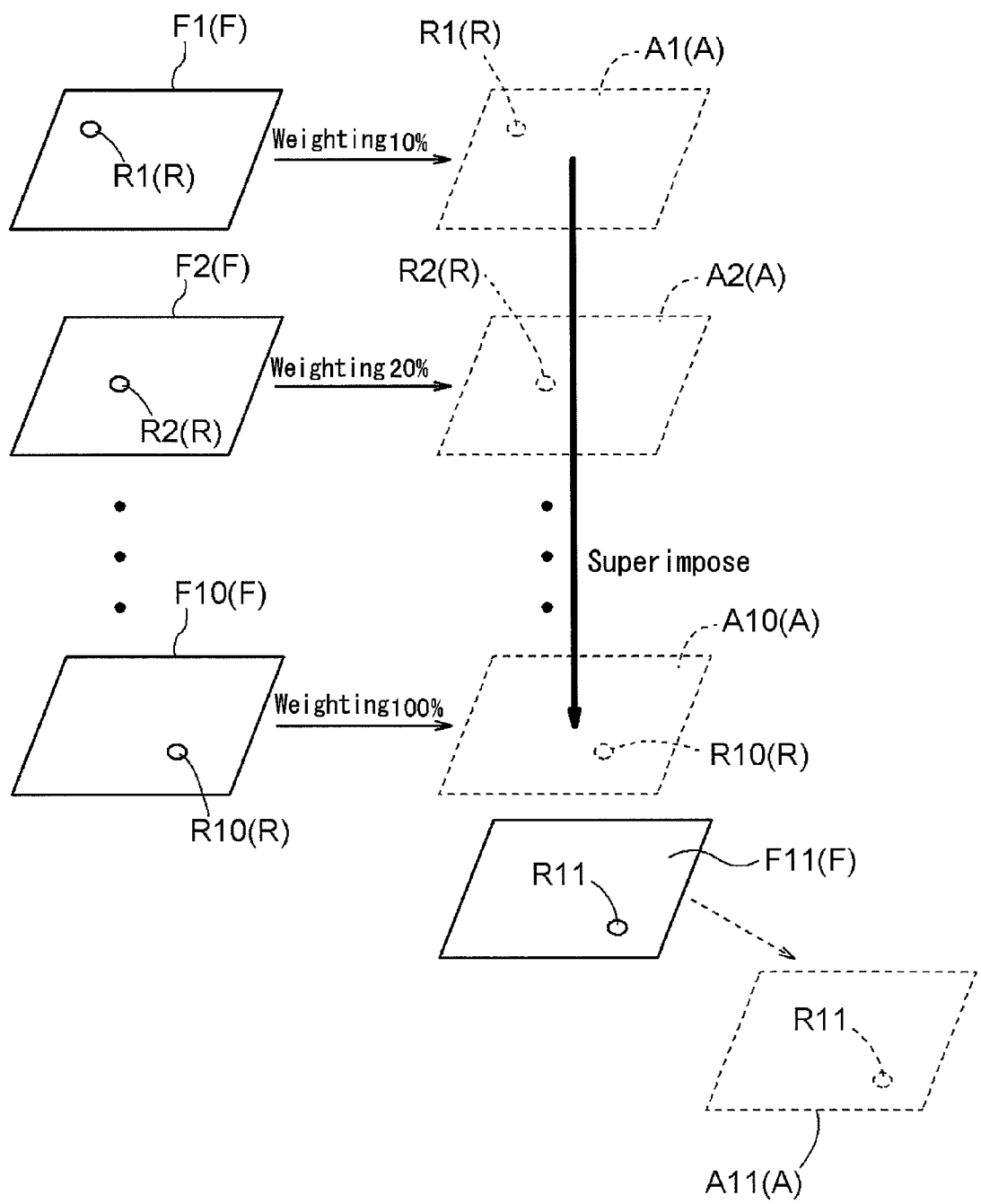
FIG. 6 is a diagram for explaining an image formation principle.
Figure 7:
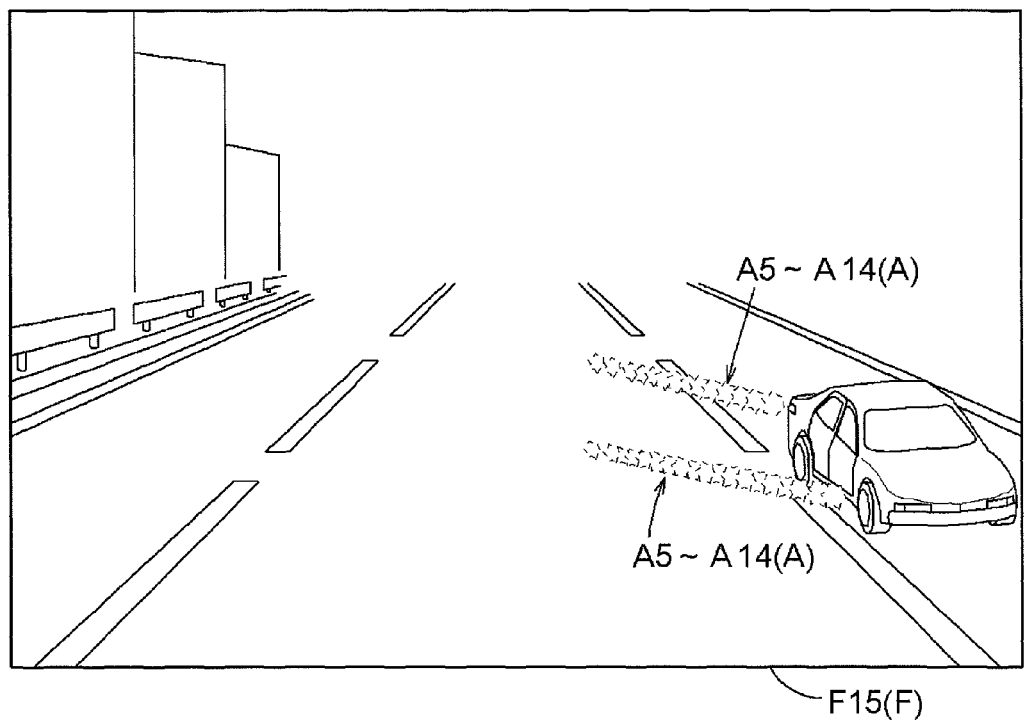
FIG. 7 is a diagram illustrating an example of a display image displayed on the monitor.

As illustrated in FIG. 3, according to the embodiment, the generated display image is displayed on the display portion 42 of the rear-view mirror 40. However, in order to facilitate an explanation, a case where the display image is displayed on the monitor 20 will be described first. Illustrated in FIGS. 4, 5 and 7 are examples of the display image displayed on the monitor 20. Illustrated in FIG. 6 is a diagram for explaining the formation principle of the display image.

The display image displayed on the monitor 20 is generated on the basis of a mirror image relative to the captured image, because the display image is seen by the driver while the driver is facing forward. Illustrated in FIG. 4 is an example of the display image displayed on the monitor 20. More specifically, illustrated in FIG. 4 is an example where the display image, which is obtained in a manner where a predetermined image processing such as distort correction, a color correction and the like is executed to a frame F1 out of plural frames F, which configure the captured footage, is displayed on the monitor 20. The predetermined image processing such as the distort correction, the color correction and the like is executed by an image correcting portion and the like, which is provided at the ECU 10. The frame F1 is a frame capturing a flickering state of the direct indicator of the vehicle traveling behind the subject vehicle 30 to indicate an intention of changing lanes.

The target image area-detecting portion 2 detects an image area including picture elements belonging to the predetermined color space corresponding to a display color of the direction indicator within the frame F1 as a target image area R1 (R). The frame F1 corresponds to a target frame. Additionally, the predetermined color space corresponding to the display color of the direction indicator refers to a color space indicating a color corresponding to a red color or an orange color.

The residual image generating portion 3 generates the residual image by applying the predetermined weighting to the image within the target image area R1. Illustrated in FIG. 5 is an example of the display image on which a set of residual image A (which is configured by plural residual images A1 to A10 in order to generate a moving residual image) is superimposed on a frame F11, which is obtained in 10 frames after the frame F1 illustrated in FIG. 4 is obtained. The direction indicator of the vehicle traveling behind the subject vehicle 30 flickers during a time corresponding to a time where the frame F1 illustrated in FIG. 4 to the frame F11 illustrated in FIG. 5 are obtained. The residual image generating portion 3 generates residual images A1 to A10 so as to correspond to target image areas R1 to R10, which are detected within frames F1 to F10, respectively.

Illustrated in FIG. 6 is a diagram for explaining a principle for generating the display image, which is obtained by superimposing the residual image A (a set of residual images) on the frame F. In order to facilitate the explanation, the digital camera, which films a footage (a moving image) of 10 frames per second, is used as the camera 12. The ECU 10 receives the footage and detects the target image areas R from the frames of the received footage respectively. Then, the ECU 10 generates the residual image A (a set of residual images A). In the example illustrated in FIG. 6, the latest frame F received by the ECU 10 is set as the frame F11. The ECU 10 receives the Frame F1 a second before the ECU receives the frame F11. In other words, the ECU 10 receives the frames F2 to F10 every 0.1 second after the ECU 10 receives the frame F1.

The frames F1 to F10 serve as the target frames, respectively. The frame F1 is set as the target frame and the image area, which includes the picture elements corresponding to the display color of the direction indicator, is detected as the target image area R1. Then, the frame F2 is set as the target frame and the target image area R2 is detected. Similarly, each of the frames F3 to F10 is set as the target frame and each of the target image areas R3 to R10 is detected. In other words, the target image area R is detected from each frame in a past one second relative to the latest frame F11.

Then, the predetermined weighting is applied to the image of each of the target image areas R1 to R10 in order to generate the residual images A1 to A10. More specifically, a greater weighting is applied to later frames relative to the frame F, which is set as a base image to be displayed as the display image and which is obtained the most recently (i.e. the frame F11) in order to change image intensity over time. For example, when assuming a level (a degree) of the weighting applied to the target image area R10 obtained from the frame F10 is 100% to generate the residual image A10, approximately 90% of the weighting, which is lower than the weighting applied to the target image area R10, is applied to the target image area R9 obtained from the frame F9. Accordingly, a level of the weighting applied to the target image area R8 obtained from the frame F8 to the target image area R1 obtained from the frame F1 is sequentially reduced (i.e. the older the target image area R is, the less weighting is applied thereto) in order to generate residual images A8 to A1.

Accordingly, the predetermined weighting is set in a manner where the longer a capturing time difference becomes between the frame F and the other target frames, the smaller weighting is applied to the target image area R. In the example illustrated in FIG. 6, the level (the degree) of the weighting is linearly reduced by 10 percent. Alternatively, the level (the degree) of the weighting may be logarithmically changed or the level of the weighting may be changed so as to draw a quadratic curve.

Each residual image A is generated as the image so that the target image area R on the residual image A is not displaced from a coordinate where the target image are R on the target frame F is detected. As illustrated in FIGS. 4 and 5, as the vehicle traveling behind the subject vehicle 30 is moving to the right in FIGS. 4 and 5, the position of the target image area R is also shown at different coordinates as if the target image area R also moves to the right on the frame F. Accordingly, the residual image A (a set of residual images A) is shown as if the residual image also moves to the right. When the residual images A1 to A10 (10 residual images), which are obtained in the last one second, are superimposed on one another, a residual image indicating a trajectory of the vehicle traveling behind of the subject vehicle 30 for one second is obtained. Then, when 10 residual images A1 to A10 are superimposed on the latest frame F11, the display image based on the latest frame F11 is generated. Illustrated in FIG. 5 is an example of the generated display image. As illustrated in FIG. 5, a residual image indicating the trajectory of the direction indicator of the vehicle traveling behind the subject vehicle 30 is superimposed on the frame F11.

As described above, because the lower level of the weighting is applied to the older target image area to generate the residual image A, in a case where the latest frame is set as a frame F12, the oldest residual image A1 is removed so as not to be superimposed on the frame F11. As illustrated in FIG. 6, a target image area R11 is detected on the frame F11, which is set as the base image of the display image, so that a residual image A11 is generated. Accordingly, when the frame F12 is set as the latest frame, the latest residual image A11 is superimposed on the frame F12. For example, in a case where a frame F15 is set as the latest frame F, residual images A5 to A14, which are generated from the respective frames F5 to F14, are superimposed on the frame F15 (see FIG. 7).

In the example illustrated in FIG. 5, the residual images A1 to A10 are superimposed on the frame F11, which is followed by the target frames F1 to F10, on the same coordinates as the target image areas R1 to R10 are detected. In other words, for example, the residual image A1 is superimposed on the frame 11 on the same coordinate thereof where the target image area R1 is detected. Accordingly, the display image is generated. In an example illustrated in FIG. 7, the residual images A5 to A14 are superimposed on the frame 15, which is followed by the frames F5 to F14, at the same coordinates as the target image areas R5 to R14 are detected. Accordingly, the display image is generated.

Focusing on one target frame, it can be rephrased that the residual image is superimposed on at least one frame followed by the target frame on the same coordinate as the target image area is detected on the target frame, thereby generating the display image. For example, in the case where the frame F1 is set as the target frame, the residual image A1 is superimposed on the frames F2 to F11, which follow the target frame F1, on the same coordinate thereof as the target image area R1 of the target frame F1 is detected.

In the above-described embodiment, each frame, which configures the captured image (the footage), is set as the target frame and the target image area is detected from each target frame. Alternatively, every couple of frames may be set as the target frame.

Accordingly, by superimposing the residual image (a set of residual images A), the driver may feel changes in the circumstances, such as the emergence or occurrence of something, as the indication, which may induce the driver to visually confirm the circumstances around the vehicle. Therefore, in the case where changes in the circumstances occur, i.e. in the case where something emerges or occurs, the surrounding recognition assisting device may appropriately induce the driver to visually confirm the changes. As a result, the surround recognition assisting device may lead the driver to perform an appropriate driving operation, which may further result in inducing to a safe driving.

In this embodiment, the rear view (i.e. the view expanding rearward relative to the vehicle 30) including the residual image (a set of residual images) is displayed on the monitor 20 in order to facilitate the explanation. It may not be appropriate to gaze at the monitor 20 while the driver drives the vehicle 30. However, according to the embodiment, because the surrounding recognition assisting device displays the residual image in order to give the driver an indication, the surrounding recognition assisting device may not interfere in driving (i.e. may not disrupt a driving operation of the driver). Furthermore, it may be preferable to display the residual image (a set of residual images) on the rear-view mirror 40, which the driver is supposed to look at frequently. In other words, it may be preferable to use the rear-view mirror 40 as the display device.

As described above, the rear-view mirror 40 includes the mirror portion 41, which serves as a mirror to reflect the rear view, and the display portion 42 for displaying at least a portion of the display image displayed on the monitor 20. The half mirror is adapted as the mirror portion 41. Furthermore, the liquid crystal display is provided at the back side (i.e. the inside) of the half mirror as the display portion 42. A size of a screen of the monitor 20, i.e. a ratio of numbers of picture elements between height and width of a landscape size of a general digital image is set to be 3 to 4 (i.e. height:width=3:4). The ratio of numbers of picture elements between height and width of a wide-sized digital image is set to be 3 to 5 (i.e. height:width=3:5). On the other hand, a ratio between height and width of the general rear-view mirror 40 is set to be 1 to 3 (i.e. height:width=1:3) or longer in a longitudinal direction. Therefore, with reference to the width of the image (i.e. a length in a longitudinal direction or a length in a horizontal direction), a portion of the display image, which is obtained by trimming upper and bottom portions of the display image, is displayed on the display portion 42 of the rear-view mirror 40.

Accordingly, because the display image including the residual image A (a set of residual images A) is displayed on the display portion 42 of the rear-view mirror 40, the residual image is appropriately shown to the driver. However, the rear-view mirror 40 also includes the mirror portion 41, therefore, the rear view (i.e. the view expanding rearwardly of the vehicle 30) does not need to be the image captured by the camera 12. Accordingly, in a case where the display image to be displayed on the display portion 42 of the rear-view mirror 40 is generated, the display image generating portion 4 superimposes the residual image A on a blank image, which is obtained by deleting the captured image (the frame F), thereby generating the display image. In other words, the display image displayed on the display portion 42 of the rear-view mirror 40 is a set of plural residual images A, which are generated from the respective plural frames F.

Figure 8:
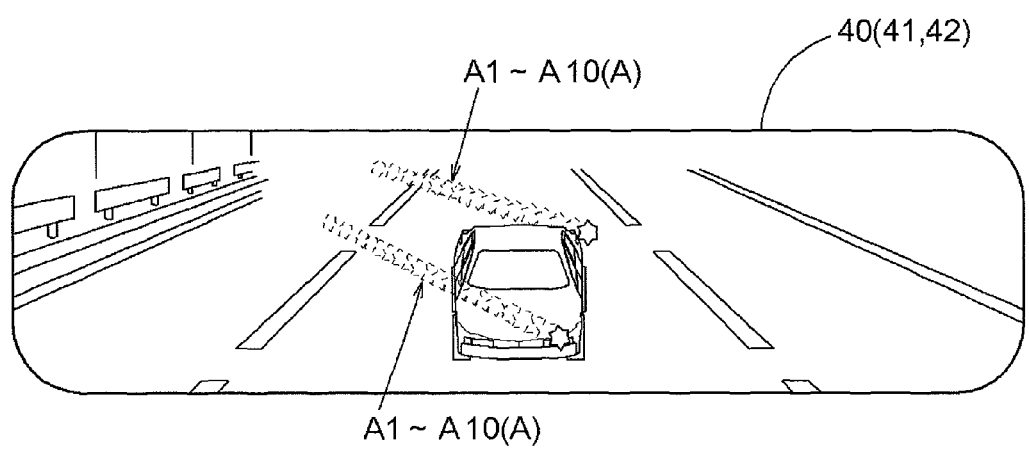
FIG. 8 is a diagram illustrating an example of a display image displayed on a display portion of a rear-view mirror.

Illustrated in FIG. 8 is an example of a display image displayed on the display portion 42 of the rear-view mirror 40. In this example, the residual image A is superimposed on the rear view reflected on the mirror portion 41 of the rear-view mirror 40 as the display image. Accordingly, the driver may feel an indication of the other vehicle changing lanes via the residual image displayed on the rear-view mirror 40.

As described above, the residual image A (a set of residual images A) is superimposed on the captured image (the frame F) at the coordinate thereof corresponding to the position (the coordinate) where the target image area is detected from the respective target frames. Although the rear view of the vehicle 30 reflected on the rear-view mirror 40 is not a captured image, a display position of the residual image A is not likely to be largely displaced relative to the view reflected on the rear-view mirror 40 (i.e. the display position of the residual image A is not likely to be largely displayed from a position where the residual image A is supposed to be shown on the rear-view mirror 40). Generally, the driver adjusts an angle of the rear-view mirror 40 while the driver is seated on the driver seat to take a driving posture before the driver starts driving the vehicle 30, in order to obtain rearward visibility properly. Therefore, a view reflected on the mirror portion 41 of the rear-view mirror 40 is supposed to be substantially the same without being influenced by a physical size of the driver, a position or a posture of the driver seat or the like. Accordingly, the residual image A may be displayed on the display portion 42 without being largely displaced relative to the image reflected on the mirror portion 41 of the rear-view mirror 40 in a manner where: average (standard) coordinates are set for the display portion 42 of the rear-view mirror 40; the coordinates of the residual image are related to the average coordinates; and then, a simple coordinate conversion is executed.

Alternatively, a resolution level for the residual images A on the respective frames F may be set so as to differ from a resolution level (an optical resolution) for the display portion 42 of the rear-view mirror 40, in other words, a level of coordinates set for the frames F does not need to be consistent with a level of coordinates set for the display portion 42 of the rear-view mirror 40. Accordingly, the displacement between the residual image A and the view reflected on the display portion 42 may be absorbed. More specifically, the monitor 20 has a resolution level of Quarter Video Graphics Array (QVGA: 320×240 resolution) or a resolution level of Video Graphics Array (VGA: 640×480 resolution), because the monitor 20 is also used as the display device of the navigation system and the like. Therefore, frames F, from which the residual images A are generated, also have the resolution level of QVGA or VGA. On the other hand, a detailed graphic description is not necessary for the display portion 42 of the rear-view mirror 40. Therefore, the resolution level lower than the resolution level of the QVGA may be set for the display portion 42 of the rear-view mirror 40.

When supposing that the resolution level of the display portion 42 of the rear-view mirror 30 is set to be one fourth of the resolution level of QVGA and the resolution level of the frames F is set to be equal to the resolution level of QVGA, a set of four picture elements of each residual image A corresponds to one picture element on the display portion 42 of the rear-view mirror 40. Therefore, even if the residual image A is displayed on the display portion 42 of the rear-view mirror 40 while the residual image A is displaced from the position where the residual image A is supposed to be shown by one picture element set for the frames F, the residual image A is still displayed on the same coordinate (i.e. the coordinates on which the residual image A is supposed to be shown when the displacement does not occur) or the neighboring coordinate on the display portion 42 of the rear-view mirror 40, so that the displacement of the residual image A is not likely to occur substantially. When supposing that the resolution level of the frames F is set to be equal to the resolution level of VGA, a set of sixteen picture elements of each residual image A corresponds to one picture element of the display portion 42 of the rear-view mirror 40. In this case, even if the residual image A is displayed on the display portion 42 of the rear-view mirror 40 while the residual image A is displaced from the position at which the residual image A is to be shown at most by fifteen picture elements set for the frames F, the residual image A is still displayed on the same coordinate (i.e. the coordinate on which the residual image A is supposed to be shown when the displacement does not occur) or the neighboring coordinate on the display portion 42 of the rear-view mirror 40. The residual image A (a set of residual images A) is displayed on the display portion 42 of the rear-view mirror 40 in order to give the driver an indication. Therefore, detailed coordinate does not need to be set for the display portion 42 of the rear-view mirror 40. Hence, even in a case where the residual image A is displayed on the display portion 42 of the rear-view mirror 40 with reference to the coordinate on the frame F of the captured image, the residual image A may be naturally displayed on the display portion 42 of the rear-view mirror 40.

Additionally, as illustrated by a dashed line, an angle sensor and the like may be provided at an attachment portion of the rear-view mirror 40 as a mirror position detecting portion 45 (i.e. a mirror posture detecting portion), so that the coordinates of the rear-view mirror 40 are adjusted in response to an angle of the rear-view mirror 40. Alternatively, an adjusting portion 55 (an adjusting mode) for adjusting the rear-view mirror 40 may be provided at the surrounding recognition assisting device so that the captured image, which are faintly displayed on the display portion 42 of the rear-view mirror 40, are overlapped with the reflected view reflected on the mirror portion 41. In other words, even if the captured image is displayed on the display portion 42 of the rear-view mirror 40 so as to be displaced from the view reflected on the mirror, the position of the captured image to be displayed may be adjusted so as to be overlapped with the image reflected on the mirror portion 41 by means of the adjusting portion 55, which is actuated by the driver.

As is well known, the footage (the moving image) is configured by plural frames. Furthermore, as described above, an image within a target image area, which is detected from one frame, is displayed on the same coordinate (i.e. the coordinate corresponding to a position where the image is detected) on the following frames, thereby generating the residual images. Then, the residual image is displayed on the monitor 20 or the display portion 42 of the rear-view mirror 40, so that the surrounding recognition assisting device gives the driver an indication of changes in the circumstances, such as the appearance or the occurrence of something, which may induce the driver to confirm the circumstances around the vehicle 30. Accordingly, in the case where changes in the circumstances, such as the appearance or the occurrence of something, occurs, the surrounding recognition assisting device appropriately leads the driver to visually confirm the circumstances around the vehicle 30. As a result, the driver's awareness for safe driving may smoothly be reflected on an appropriate driving operation, thereby assisting the safe driving.

Furthermore, the surrounding recognition assisting device of the embodiment may give the driver an indication of changes in the circumstances by a simple image processing without detecting the existence of another vehicle and the like (i.e. without executing a detailed image recognition to detect another vehicle and the like). In other words, the ECU 10 illustrated in FIG. 3 has a very simple function, therefore, each functional portion of the ECU 10 may be provided within the camera 12. In this case, the camera 12 may be provided to any vehicle without being adjusted so as to be suitable to a variety of vehicles. There exists an in-car camera that is configured as a camera module in which the processor or the digital signal processor (DSP) for executing a basic image processing is provided. Such processor or the DSP generates a residual image or a display image with relatively light processing load. Therefore, an additional function may be added to the camera 12 without any increase in manufacturing costs. In other words, a value-added in-car camera (i.e. an in-car camera module) may be achieved.

Generally, the footage (the moving image) is configured with plural frames. Furthermore, an image within a target image area, which is detected from one frame, is displayed on the same coordinate (i.e. the coordinate corresponding to a position where the image is detected) on the following frames, thereby generating the residual image. The surrounding recognition assisting device may give the driver an indication of changes in the circumstances, such as the appearance or the occurrence of something, which may induce the driver to visually confirm the circumstances around the vehicle 30. Accordingly, in the case where changes in the circumstances, such as the appearance or the occurrence of something, occurs, the surrounding recognition assisting device appropriately leads the driver to visually confirm the circumstances around the vehicle 30. As a result, the surrounding recognition assisting device of the embodiment may assisting the safe driving. Additionally, the surrounding recognition assisting device of the embodiment may support the safe driving by a simple image processing and in conjunction with visual confirmation by the driver without detecting the existence of another vehicle and the like (i.e. without executing a detailed image recognition to detect another vehicle and the like). Therefore, the surrounding recognition assisting device may be configured with relatively low manufacturing costs. Furthermore, the surrounding recognition assisting device of the embodiment is not configured so as to alarm the driver, therefore, the driver may not feel irksome. Additionally, even if the surrounding recognition assisting device of the embodiment generates a residual image of an unnecessary target, the driver may not feel irksome because the surrounding recognition assisting device of the embodiment does not actively alarm or inform the driver. As a result, the surrounding recognition assisting device having high convenience may be achieved.

According to the embodiment, the predetermined weighting is set so that the level thereof decreases as the capturing time difference between the target frame and the frames following the target frame becomes greater.

The residual image may be formed so as to fade as time goes by. More specifically, the weighting for generating the residual image is set in a manner where the level (the degree) of the weighting to a single frame is reduced as new frames are taken, so that the residual image fades as time goes by. Accordingly, the residual images may be appropriately generated.

According to the embodiment, the predetermined color space corresponding to the display color of the direction indicator includes the color space indicating the color corresponding to the orange color.

According to the embodiment, at least two or more of the frames, which configure the captured footage, are set as the target frames, respectively.

According to the embodiment, the target image area-detecting portion 2 detects each of the frames, which configure the captured footage, as the target frame.

Each frame configuring the footage (the captured image, the captured moving image) is set as the target frame, so that a continuous (seamless) residual image (a set of residual images A) is generated.

According to the embodiment, the surrounding recognition assisting device for the vehicle further includes 1 the rear-view mirror 40 serving as the display device and having the mirror portion 41 for reflecting the rear view of the vehicle 30 and the display portion 42 for displaying at least a portion of the display image. Furthermore, the image capturing device includes the camera 12 for capturing the view expanding rearwardly of the vehicle 30. The display image generating portion 4 superimposes the residual image on the blank image, which is obtained by deleting the captured image, in order to generate the display image.

According to the embodiment, the angle sensor and the like is provided at the attachment portion of the rear-view mirror 40 as the mirror position detecting portion 45, so that the coordinate of the residual image on the display portion 42 is adjusted in response to the angle of the rear-view mirror 40.

According to the embodiment, the surrounding recognition assisting device for the vehicle further includes the adjusting portion 55 for faintly displaying the residual image on the display portion 42 of the rear-view mirror 40 and adjusting the position of the residual image so that the residual image overlaps with the view reflected on the mirror portion 41.

The driver may feel changes in the circumstances such as the appearance or occurrence of something when the residual image is displayed on the rear-view mirror 40. Then, the driver is expected to visually confirm the circumstances around the vehicle 30 when the driver feels the changes in the circumstances via the rear-view mirror 40. Such an action of the driver follows a normal driving operation. In other words, the surrounding recognition assisting device of the embodiment may induce the driver to visually confirm the circumstances around the vehicle 30 without causing the irksome feeling to the driver. Additionally, the position of the residual image on the display portion 42 of the rear-view mirror 40 does not need to precisely coincide with the view reflected on the mirror portion 41 of the rear-view mirror 40, as long as the driver feels the indication via the residual image. Generally, the driver adjusts the position (an angle) of the rear-view mirror 40 on the basis of the driver's eye point before driving the vehicle. Therefore, the view reflected on the rear-view mirror 40 is supposed to be substantially the same regardless of drivers. Accordingly, the residual image may be displayed at position which is not greatly displaced from a position where the residual image is supposed to appear even if the position of the residual image is not precisely adjusted depending on drivers.

The principles, preferred embodiment and mode of operation of the present invention have been described in the foregoing specification. However, the present invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the present invention as defined in the claims, be embraced thereby.

The invention claimed is:

1. A surrounding recognition assisting device for a vehicle comprising:
an image receiving portion for receiving a captured footage, which is configured with a plurality of frames captured by an image capturing device for capturing a view around the vehicle;
a target image area-detecting portion for detecting an image area including a picture element belonging to a predetermined color space corresponding to a display color of a direction indicator within a target frame out of the plurality of frames, which configure the captured footage, as a target image area;
a residual image generating portion for applying a predetermined weighting to an image within the target image area in order to generate a residual image; and
a display image generating portion for superimposing the residual image on at least one of frames following the target frame so that the residual image is superimposed on the frame at a corresponding coordinate to generate a display image to be displayed on a display device.

2. The surrounding recognition assisting device for the vehicle according to claim 1, wherein the predetermined weighting is set so that a level thereof decreases as a capturing time difference between the target frame and the frames following the target frame becomes greater.

3. The surrounding recognition assisting device for the vehicle according to claim 1, wherein the predetermined color space corresponding to the display color of the direction indicator includes a color space indicating a color corresponding to an orange color.

4. The surrounding recognition assisting device for the vehicle according to claim 1, wherein at least two or more of the frames, which configure the captured footage, are set as target frames, respectively.

5. The surrounding recognition assisting device for the vehicle according to claim 1, wherein the target image area-detecting portion detects each of the frames, which configure the captured footage, as the target frame.

6. The surrounding recognition assisting device for the vehicle according to claim 1 further comprising a rear-view mirror serving as the display device and having a mirror portion for reflecting a rear view of the vehicle and a display portion for displaying at least a portion of the display image, wherein the image capturing device includes a camera for capturing a view expanding rearwardly of the vehicle and the display image generating portion superimposes the residual image on a blank image, which is obtained by deleting the captured image, in order to generate the display image.

7. The surrounding recognition assisting device for the vehicle according to claim 6, wherein the predetermined weighting is set so that a level thereof decreases as a capturing time difference between the target frame and the frames following the target frame becomes greater.

8. The surrounding recognition assisting device for the vehicle according to claim 7, wherein the predetermined color space corresponding to the display color of the direction indicator includes a color space indicating a color corresponding to an orange color.

9. The surrounding recognition assisting device for the vehicle according to claim 8, wherein at least two or more of the frames, which configure the captured footage, are set as target frames, respectively.

10. The surrounding recognition assisting device for the vehicle according to claim 8, wherein the target image area-detecting portion detects each of the frames, which configure the captured footage, as the target frame.

11. The surrounding recognition assisting device for the vehicle according to claim 6, wherein an angle sensor and the like is provided at an attachment portion of the rear-view mirror as a mirror position detecting portion, so that a coordinate of the residual image on the display portion is adjusted in response to an angle of the rear-view mirror.

12. The surrounding recognition assisting device for the vehicle according to claim 6 further comprising an adjusting portion for faintly displaying the residual image on the display portion of the rear-view mirror and adjusting a position of the residual image so that the residual image overlaps with the view reflected on the mirror portion.

* * * * *